Nov. 21, 1967  M. SEIGNEURIN  3,353,272
DENTAL HAND PIECES
Filed Nov. 3, 1964

United States Patent Office 3,353,272
Patented Nov. 21, 1967

3,353,272
DENTAL HAND PIECES
Michel Seigneurin, Ecole, near Besancon, Doubs, France, assignor to Micro-Mega, a joint-stock company, Besancon, Doubs, France
Filed Nov. 3, 1964, Ser. No. 408,698
2 Claims. (Cl. 32—27)

ABSTRACT OF THE DISCLOSURE

A dental handpiece composed of a cylindrical body containing a pair of sockets, a two-part longitudinal rotating shaft journalled in the sockets, these parts having facing ends in register and connected by a reduction gearing entirely housed in the body, the gearing having a first toothed wheel of unequal diameter carried by the ends of the shaft, two other toothed wheels of unequal diameter, the smaller of the wheels being in mesh with the larger of the first wheels and the larger with the smaller of the first wheels and mounted on an intermediate cross-shaft at right angles to the rotating shaft on either side of it, the larger of the first wheels having the shape of a bell for partially housing therein the larger of the wheels of the intermediate cross-shaft, a third socket intermediate the two other sockets and having bores in it for receiving the wheels and the intermediate cross-shaft.

---

Figure 1:
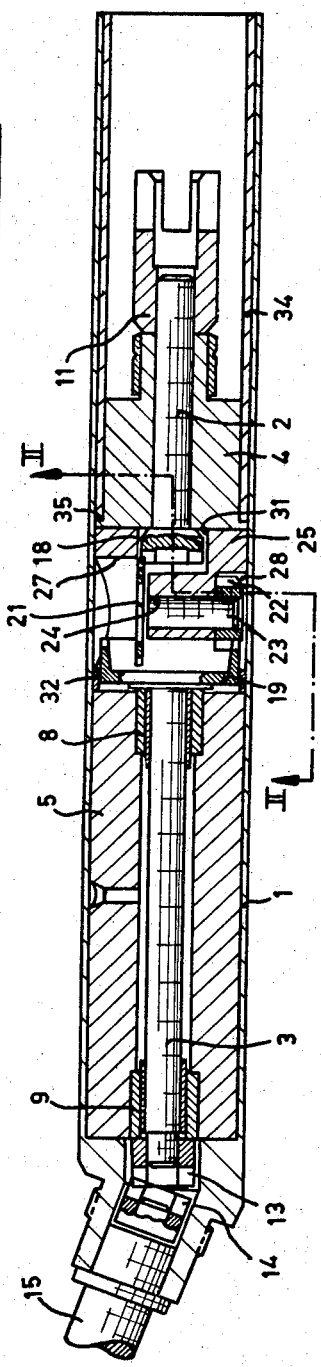

The present invention relates to improvements in dental handpieces.

Modern technics in dental surgery have given rise to the need of rotating instruments with widely spread speed ranges, for instance from speeds of the order of 300,000 r.p.m. down to speeds as low as 300/500 r.p.m.

It is therefore resorted to turbines for very high velocities, whereas, for average velocities, of the order of 2000/15,000 r.p.m., electronic motors are used. With a view to extending the range of the latter velocities, either upwards or downwards, it is resorted to speed multipliers or speed reducers.

It is therefore an object of the present invention to provide dental handpieces, or counter shafts, with an integral speed reducer.

A further object of the present invention is to provide a dental handpiece wherein the rotating longitudinal shaft mounted within the body of said handpiece is interrupted and wherein the two shaft ends in register are connected by means of a speed reduction gearing entirely housed within said body.

According to a first embodiment, the two shaft ends in register of the longitudinal shaft respectively carry two toothed wheels having unequal diameters, in mesh with two toothed wheels of corresponding diameters integral with an intermediate shaft, the axis of which is at right angles to the axis of said longitudinal shaft.

The various features of the present invention are pointed out in the claims. For a better understanding of this invention, its advantages and specific objects, reference should be had to the accompanying drawing showing a perferred form of embodiment of this invention.

Figure 2:
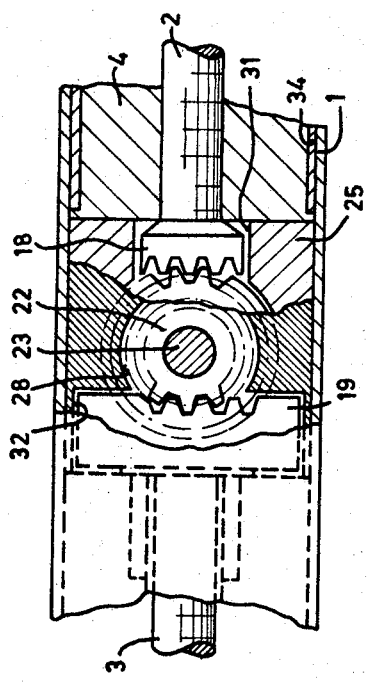

In the drawing:

FIG. 1 is a longitudinal section of a handpiece, or counter shaft, with an integral speed reducer, according to the invention, and FIG. 2, is a partial cross section along line II—II of FIGURE 1.

The handpiece or counter shaft comprises a cylindrical body 1 within which is coaxially mounted a longitudinal shaft made of two parts 2, 3 which are journalled in two sockets 4 and 5 respectively mounted within tubular body 1.

Part 2 of the longitudinal shaft is directly journalled in socket 4, whereas part 3, which is longer, is journalled, by the two ends thereof, in two bushings 8 and 9, of a metal having an appropriate friction coefficient.

One end of part 2 of the longitudinal shaft carries a driving piece 11 adapted to be coupled to a corresponding element of a conventional joint, such as for instance the so-called "wrist joint," whereas the extreme end of the other part 3 of the longitudinal shaft carries a toothed wheel 13 in mesh with another toothed wheel 14 integral with the driving oblique shaft 15 of a drill or cutter.

The two ends in register of parts 2 and 3 of the longitudinal shaft carry two toothed wheels 18, 19 respectively, toothed wheel 18 having a diameter smaller than that of toothed wheel 19 and, in the specific example shown, half of the latter.

The two toothed wheels 18 and 19 are in mesh, respectively with two other toothed wheels 21, 22, integral with an intermediate cross-shaft 23, the axis of which is at right angles to the axis of the longitudinal shaft, and which journals within a bore 24 of a socket also housed within the tubular body 1 of the handpiece, or counter-shaft, between the two sockets 4 and 5.

Toothed wheel 18 has a diameter smaller than that of toothed wheel 21 (twice smaller, in the specific example shown), and toothed wheel 22 is smaller than toothed wheel 19 (again, twice smaller, in the specific example shown), so that these two gearings together constitute a speed reducer with a 4/1 ratio.

The two toothed wheels 21 and 22 mounted on the intermediate shaft are located on one side and the other of the longitudinal shaft axis respectively, so that the two parts 2 and 3 of the latter will rotate in the same direction. Moreover, toothed wheel 19 is given the shape of a bell within which can be partially housed the bigger 21 of the two toothed wheels of the intermediate shaft. Accordingly, there is obtained a space-saving speed reducer which can be easily housed within tubular body 1 of the handpiece.

In addition to bore 24, within which is journalled the intermediate shaft 23, socket 25 is provided with a bore 27 for housing toothed wheel 21 and allowing the mounting thereof, a bore 28 for housing toothed wheel 22, a bore 31 for housing toothed wheel 18, and a bore 32 for housing toothed wheel 19.

A sleeve 34 abuts against a shouldered part 35 of socket 4 serving in the manner of a flange and it is adapted to fit the three sockets 4, 25 and 5 within body 1.

It is to be noted that the three sockets 4, 25 and 5, instead of being directly mounted within tubular body 1, could be just as well mounted within a cylindrical bushing removably set in body 1, which would permit the easily dismounting of these parts from said body, for their maintenance and, in particular, for lubricating and cleaning same, and also for all possible repairs.

Having thus described in the invention, what I claim as new and desire to be secured by Letters Patent is as follows.

I claim:

1. A dental handpiece comprising a cylindrical body, a pair of sockets in said body, a two-part longitudinal rotating shaft journalled in said sockets, said parts having facing ends in register connected by a reduction gearing entirely housed in said body, said gearing comprising: first toothed wheels of unequal diameter carried by said ends, two other toothed wheels of unequal diameter, the smaller of said wheels being in mesh with the larger of said first wheels and the larger with the smaller of said first wheels, and mounted on an intermediate cross-shaft at right angles to said rotating shaft on either side of said rotating shaft, said larger of said first wheels having the shape of a bell for partially housing therein the larger of said wheels of said intermediate cross-shaft, a third socket intermediate said sockets of said pair of sockets, said socket having bores therein for receiving said other wheels and said intermediate cross-shaft.

2. Dental handpiece according to claim 1 having a pair of metal bushings in one of said sockets and wherein one of said parts of said rotating shaft is longer than the other part and is journalled in said two bushings.

References Cited

UNITED STATES PATENTS

| | | | |
|---|---|---|---|
| 1,836,350 | 12/1931 | Whiteside | 32—26 X |
| 2,923,060 | 2/1960 | Staunt | 32—27 |

FOREIGN PATENTS 356,795  7/1922  Germany.

LOUIS G. MANCENE, *Primary Examiner.*

ROBERT E. MORGAN, *Examiner.*